(12) United States Patent
Tan

(10) Patent No.: US 11,962,898 B2
(45) Date of Patent: Apr. 16, 2024

(54) COMPUTER READABLE RECORDING MEDIUM WHICH CAN PERFORM IMAGE SENSING SYSTEM CONTROL METHOD AND IMAGE SENSING SYSTEM

(71) Applicant: PixArt Imaging Inc., Hsin-Chu (TW)

(72) Inventor: Zi Hao Tan, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 137 days.

(21) Appl. No.: 17/574,522

(22) Filed: Jan. 12, 2022

(65) Prior Publication Data

US 2023/0224578 A1    Jul. 13, 2023

(51) Int. Cl.
*H04N 23/66* (2023.01)
*H04N 23/60* (2023.01)

(52) U.S. Cl.
CPC ................. *H04N 23/665* (2023.01)

(58) Field of Classification Search
CPC .................................. H04N 23/665
See application file for complete search history.

(56) References Cited

U.S. PATENT DOCUMENTS 10,819,896 B1 * 10/2020 Tan ........................... G06T 7/74

* cited by examiner

*Primary Examiner* — Twyler L Haskins
*Assistant Examiner* — Fayez A Bhuiyan
(74) *Attorney, Agent, or Firm* — Winston Hsu

(57) ABSTRACT

An image sensing system control method comprising: (a) receiving a first polling from the control circuit by the image sensor at a first polling time; (b) triggering a first dummy read at a first dummy read time after the first polling time, to compute output motion delta occurs between the first polling time and the first dummy read time according to frames sensed by the image sensor between the first polling time and the first dummy read time; (c) receiving a second polling from the control circuit by the image sensor at a second polling time after the first dummy read time; and (d) outputting the output motion delta to the control circuit by the image sensor in a predetermined time range of the second polling time.

23 Claims, 5 Drawing Sheets

COMPUTER READABLE RECORDING MEDIUM WHICH CAN PERFORM IMAGE SENSING SYSTEM CONTROL METHOD AND IMAGE SENSING SYSTEM

BACKGROUND OF THE INVENTION

1. Field of the Invention

The present invention relates to an image sensing system control method and an image sensing system, and particularly relates to an image sensing system control method and an image sensing system which can reduce the effect caused by non-synchronization between the frame rate and the MCU polling and can reduce motion reporting latency.

2. Description of the Prior Art

In an optical navigation device such as an optical mouse, the image sensor thereof captures frames at a predetermined frame rate and then computes the motion deltas between different frames. Such predetermined frame rate may change corresponding to different modes, for example, an active mode or a standby mode. Also, a MCU (micro control unit) polls the image sensor for motion delta (i.e. request the image sensor to output motion delta). However, the MCU polling rate and the image sensor frame rate are usually different and non-synchronized with each other. As a result, motion delta output and MCU polling will never be consistent.

FIG. 1 is a schematic diagram illustrating the non-synchronization between the frame rate and the MCU polling in prior art. As illustrated in FIG. 1, frames f1, f2 . . . f8 are captured by an image sensor, and motion delta D1, D2 . . . between different frames are respectively computed by the image sensor. Also, a MCU coupled to the image sensor generates pollings P1-P3 to request motion delta.

For more details, the image sensor outputs motion deltas D1, D2 to the MCU responding to the polling P1, outputs motion deltas D3, D4, D5 to the MCU responding to the polling P2, and outputs motion deltas D6, D7 to the MCU responding to the polling P3. However, due to the non-synchronization, the pollings P1, P2, P3 respectively has different latencies L1, L2, L3 from the frames f3, f6, and f8. Also, due to the non-synchronization, the MCU may receive different numbers of motion deltas responding to different pollings. For example, the MCU receives two motion deltas D1, D2 for the polling P1, but receives three motion deltas D3, D4, D5 for the polling P2.

Further, in some cases, the motion delta is not immediately output to the MCU, for example, computation of the motion delta D1, D2 is triggered by the polling P1 but is output responding the poling P2 rather than the polling P1. Such issue is called motion reporting latency, and becomes more serious if the optical navigation device has a low MUC polling rate. For example, a conventional optical navigation device always has a MCU polling rate of 1000 Hz, but some optical navigation devices may have a MCU polling rate of 60 Hz in order to save power or to synchronize with a low speed system.

Since the motion deltas are always applied to compute a position of the optical navigation device, the issues illustrated in FIG. 1 may affect the accuracy of position computation.

SUMMARY OF THE INVENTION

One objective of the present invention is to provide an image sensing system control method which can improve the motion reporting latency and the affect caused by non-synchronization between the frame rate and the polling rate.

Another objective of the present invention is to provide an image sensing system which can improve the motion reporting latency and the affect caused by non-synchronization between the frame rate and the polling rate.

One embodiment of the present invention provides a non-transitory computer readable recording medium comprising at least one program code recorded therein, an image sensing system control method applied to an image sensing system comprising an image sensor and a control circuit can be performed when the program code is executed. The image sensing system control method comprises: (a) receiving a first polling from the control circuit by the image sensor at a first polling time; (b) triggering a first dummy read at a first dummy read time after the first polling time, to compute output motion delta occurs between the first polling time and the first dummy read time according to frames sensed by the image sensor between the first polling time and the first dummy read time; (c) receiving a second polling from the control circuit by the image sensor at a second polling time after the first dummy read time; and (d) outputting the output motion delta to the control circuit by the image sensor in a predetermined time range of the second polling time.

Another embodiment of the present invention further provides an image sensing system which applies the above-mentioned image sensing system control method.

Still another embodiment of the present invention provides a non-transitory computer readable recording medium comprising at least one program code recorded therein, an image sensing system control method applied to an image sensing system comprising an image sensor and a control circuit can be performed when the program code is executed. The image sensing system control method comprises: (a) receiving a first polling at a first polling time and a second polling at a second polling time from the control circuit, wherein the second polling time is after the first polling time; (b) triggering a first dummy read at a first dummy read time after the first polling time and triggering a second dummy read at a second dummy read time before the first polling time; (c) corresponding to the first dummy read, computing output motion delta occurs between the first dummy read time and the second dummy read time according to frames sensed by the image sensor between the first dummy read time and the second dummy read time; and (d) outputting the output motion delta to the control circuit by the image sensor in a predetermined time range of the second polling time.

In view of above-mentioned embodiments, the motion reporting latency can be improved since the output motion delta is computed at the dummy read time rather than a previous polling. Besides, the output motion delta is generated corresponding to the time difference between a dummy read time and a polling time of the polling, thus can reduce the affect caused by non-synchronization between the frame rate and the polling.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, several embodiments are provided to explain the concept of the present invention. The components in each embodiment can be implemented by hardware (e.g. a circuit or a device), or by firmware (such as a processor installed with at least one program). Further, the components in each embodiment can be separated into more components or be integrated to fewer components. Additionally, the term "first", "second" . . . in following descriptions are only for distinguishing elements or steps, but do not mean to limit the sequence thereof.

Figure 1:
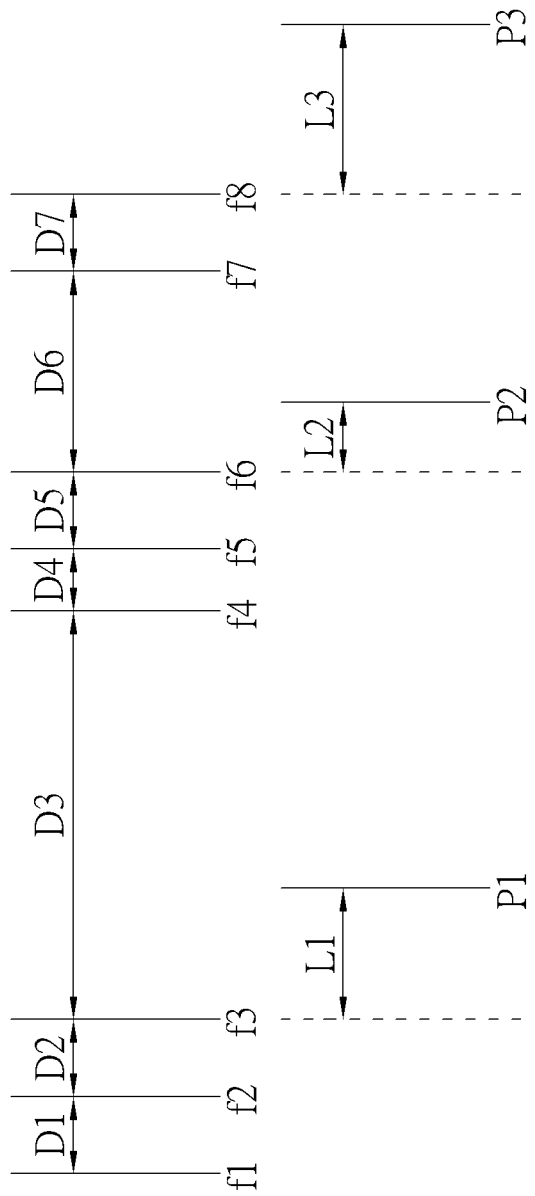
FIG. 1 is a schematic diagram illustrating the non-synchronization between the frame rate and the MCU polling in prior art.
Figure 2:
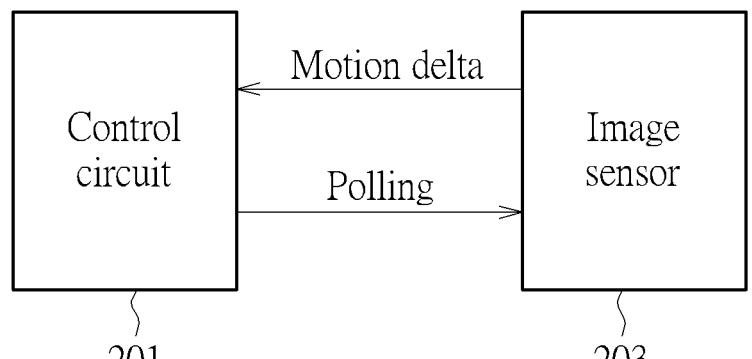
FIG. 2 is a block diagram illustrating an image sensing system according to one embodiment of the present invention.

FIG. 2 is a block diagram illustrating an image sensing system 200 according to one embodiment of the present invention. As illustrated in FIG. 2, the image sensing system 200 comprises a control circuit 201 and an image sensor 203. The control circuit 201 can be above-mentioned MCU or any other device which can perform the same function, such as a processor. The image sensor 203 is configured to sense a plurality of frames and to compute motion deltas between different frames. The control circuit 201 generates pollings to the image sensor 203, and the image sensor 203 computes output motion deltas responding to the pollings. The control circuit 201 and the image sensor 203 can be provided in the same device, but can be provided in different devices as well.

Please note, in following embodiments, the image sensor 203 performs the operation of "computing output motion deltas". However, the operation of "computing output motion deltas" can be performed by a circuit or a device independent from the image sensor 203. In this case, such circuit or device can be regarded as a part of the image sensor 203.

Figure 3:
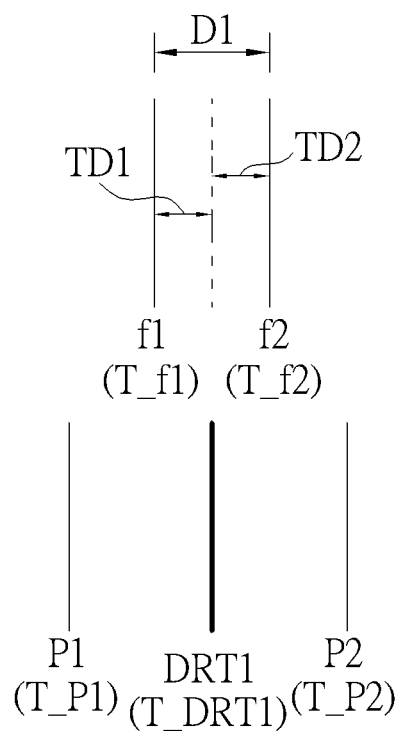
FIG. 3-FIG. 5 are schematic diagrams illustrating image sensing system control methods according to different embodiments of the present invention.
Figure 4:
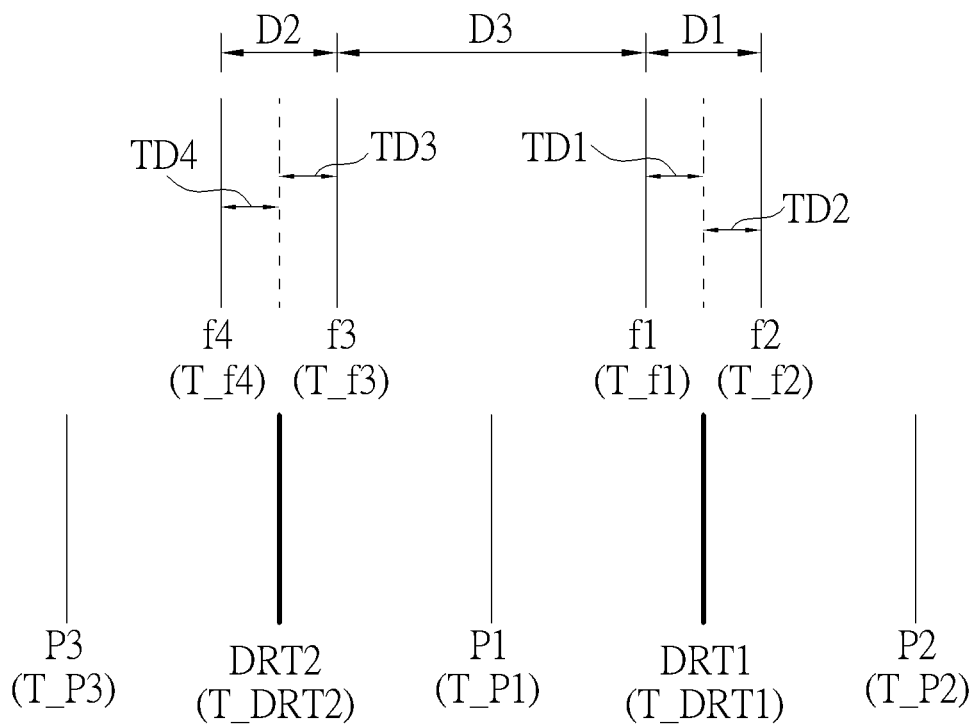
Figure 5:
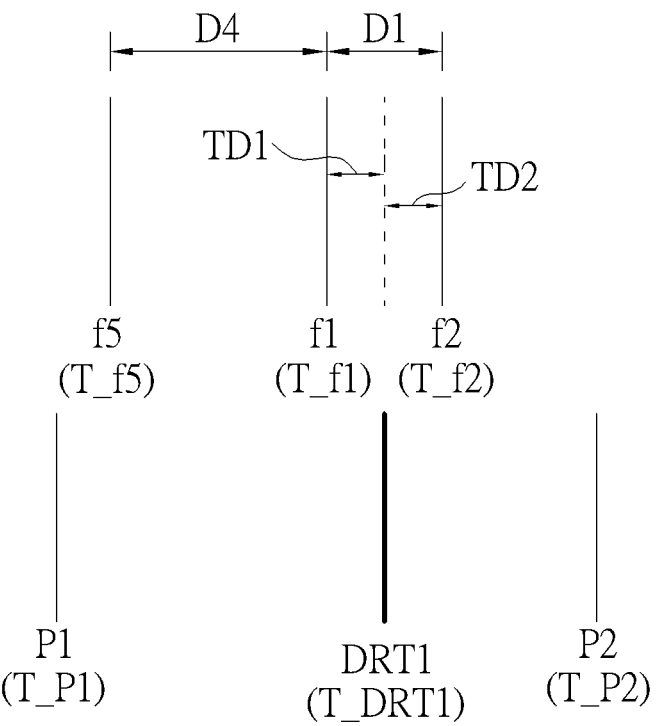

FIG. 3-FIG. 5 are schematic diagrams illustrating image sensing system control methods according to different embodiments of the present invention. As shown in FIG. 3, the image sensor 203 in FIG. 2 receives a first polling P1 from the control circuit 201 at a first polling time T_P1. Also, the image sensor 203 triggers a first dummy read DRT1 at a first dummy read time T_DRT1 responding to and after the first polling time T_P1, to compute output motion deltas occurs between the first polling time T_P1 and the first dummy read time T_DRT1 according to frames sensed by the image sensor 203 between the first polling time T_P1 and the first dummy read time T_DRT1. Besides, the image sensor 203 further receives a second polling P2 from the control circuit 201 at a second polling time T_P2 after the first dummy read time T_DRT1. Further, the image sensor 203 outputs the output motion delta to the control circuit 201 in a predetermined time range of the second polling time T_P2. For example, the image sensor 203 outputs the output motion delta to the control circuit 201 in a range of x ms (milliseconds) after the second polling time T_P2. In one embodiment, the predetermined time range is 0, which means the image sensor 203 outputs the output motion delta to the control circuit 201 at the second polling time T_P2.

For more detail, in the embodiment of FIG. 3, the image sensor 203 senses a first frame f1 at a first frame time T_f1 and senses a second frame f2 at a second frame time T_f2 after the first frame time T_f1. The first dummy read time T_DRT1 is between the first frame time T_f1 and the second frame time T_f2. In one embodiment, the first frame time f1 is a frame which is closest to the first dummy read DRT1 among the frames before the first dummy read DRT1, and the second frame f2 is a frame which is closest to the first dummy read DRT1 among the frames after the first dummy read DRT1.

In such case, the image sensor 203 computes the output motion delta according to motion delta between the first frame f1 and the second frame f2, a first time difference TD1 between the first frame time T_f1 and the first dummy read time T_DRT1, and a second time difference TD2 between the first dummy read time T_DRT1 and the second frame time T_f2. In one embodiment, the image sensor 203 computes the output motion delta according to an equation of $$D1 \times \frac{TD1}{TD1 + TD2}.$$

D1 is the motion delta between the first frame f1 and the second frame f2, TD1 is the first time difference, and TD2 is the second time difference. Therefore, in the embodiment of FIG. 3, the output motion delta computed at the first dummy read time T_DRT1 is $$D1 \times \frac{TD1}{TD1 + TD2}.$$

The image sensor 203 can further compute delta motion according to other frames besides the first frame f1 and the second frame f2 illustrated in FIG. 3. In the embodiment of FIG. 4, besides the first dummy read DRT1, the first polling N, the second polling P2, the first frame f1 and the second frame f2, the image sensor 203 further senses a third frame f3, a fourth frame f4, and receives a third polling P3 from the control circuit 201.

For more detail, in the embodiment of FIG. 4, the image sensor 203 senses the third frame f3 at a third frame time T_f3 before the first polling time T_P1, senses a fourth frame f4 at a fourth frame time T_f4 before the third frame time f3, triggers a second dummy read DRT2 at a second dummy read time T_DRT2 between the third frame time T_f3 and the fourth frame time T_f4, responding to the polling P3 which is from the control circuit 201 at the third polling time T_P3. In one embodiment, the fourth frame f4 is a frame which is closest to the second dummy read DRT2 among the frames before the second dummy read DRT2, and the third frame f3 is a frame which is closest to the second dummy read DRT2 among the frames after the second dummy read DRT2. In such case, the image sensor 203 further computes the output motion delta according to motion delta between the third frame f3 and the fourth frame f4, a third time difference TD3 between the third frame time T_f3 and the second dummy read time T_DRT2, and a fourth time difference TD4 between the second dummy read time T_DRT2 and the fourth frame time T_f4.

In one embodiment, the image sensor 203 computes the output motion delta according to an equation of $$D2 \times \frac{TD3}{TD3 + TD4}.$$

D2 is the motion delta between the third frame f3 and the fourth frame f4. Therefore, in view of the method illustrated in FIG. 3, in the embodiment of FIG. 4, the output motion delta computed at the first dummy read time T_DRT1 is $$D1 \times \frac{TD1}{TD1 + TD2} + D2 \times \frac{TD3}{TD3 + TD4} + D3.$$

D3 is the motion delta between the first frame f1 and the third frame f3. Also, if the third frame f3 and the fourth frame f4 are sensed but the first frame f1 and the second frame f2 are not sensed, the output motion delta computed at the first dummy read time T_DRT1 is $$D2 \times \frac{TD3}{TD3 + TD4}.$$

Please note, in the embodiment of FIG. 4, at least one frame can be sensed between the first frame time T_f1 and the third frame time T_f3.

Besides the examples illustrated in FIG. 3 and FIG. 4, the output motion delta can be computed based on the frames sensed at other time. For example, in the embodiment of FIG. 5, at least one frame is sensed by the image sensor 203 between the first dummy read time DRT_1 and the first polling time P1. The fifth frame f5 is sensed at a fifth frame time T_f5, which is a frame closest to the first polling time P1 among frames after the first polling time P1. In one embodiment, at least one frame is further sensed between the first frame time T_f1 and the fifth frame time T_f5. In such case, the image sensor 203 further computes the output motion delta according to motion delta between the first frame f1 and the fifth frame f5. Therefore, in the embodiment of FIG. 5, the output motion delta computed at the first dummy read time T_DRT1 is $$D1 \times \frac{TD1}{TD1 + TD2} + D4.$$

D4 is the motion delta between the first frame f1 and the fifth frame f5.

The rules explained in above-mentioned embodiments can be used independently or be combined. For example, if the embodiment illustrated in FIG. 4 comprises the fifth fame f5 in FIG. 5, the output motion delta is still $$D1 \frac{TD1}{TD1 + TD2} + D2 \times \frac{TD3}{TD3 + TD4} + D3$$

since D3 comprises the motion delta between the first frame f1 and the fifth frame f5. For another example, if the embodiment illustrated in FIG. 4 comprises the fifth fame f5 in FIG. 5, but the first frame f1 and the second frame f2 are not sensed, the output motion delta is still $$D2 \times \frac{TD3}{TD3 + TD4} + D5,$$

based on above-mentioned rules. D5 is the motion delta between the third frame f3 and the fifth frame f5. Such variation should also fall in the scope of the present invention.

As above-mentioned, the dummy read is triggered responding to a polling, and the time interval between the dummy read time and the polling time is named as a dummy time period. For example, in the embodiment of FIG. 3, the first dummy read DRT1 is triggered responding to the first polling P1, and the time interval between the first dummy read time T_DRT1 and the first polling time T_P1 is the dummy time period. The value of the dummy time period can be set corresponding to different requirements. In one embodiment, the value of the dummy time period is set to make at least one of the frame exists between the first dummy read time T_DRT1 and the second polling time T_P2. In other words, a dummy read is triggered by a polling before it, and outputs the out motion delta corresponding to a polling after it. The value of the dummy time period is set to make at least one of the frame exists between the dummy read and the polling after the dummy read.

In one embodiment, the value of the dummy time period is set to be smaller than $$\frac{1}{MP} - \frac{1}{SFm},$$

MP is a polling rate of the control circuit 201, and SFm is a minimum frame rate of the image sensor 203. For more detail, MP is a frequency that the control circuit generates pollings to the image sensor 203, such as 100 pollings/ms. Also, the image sensor 203 should operate at a frame rate larger than the minimum frame rate, or the image sensor 203 could not operate smoothly. Such minimum frame rate may be caused by different reasons, such as a hardware limitation or algorithm limitation. The SFm is the minimum frame rate mentioned here.

Figure 6:
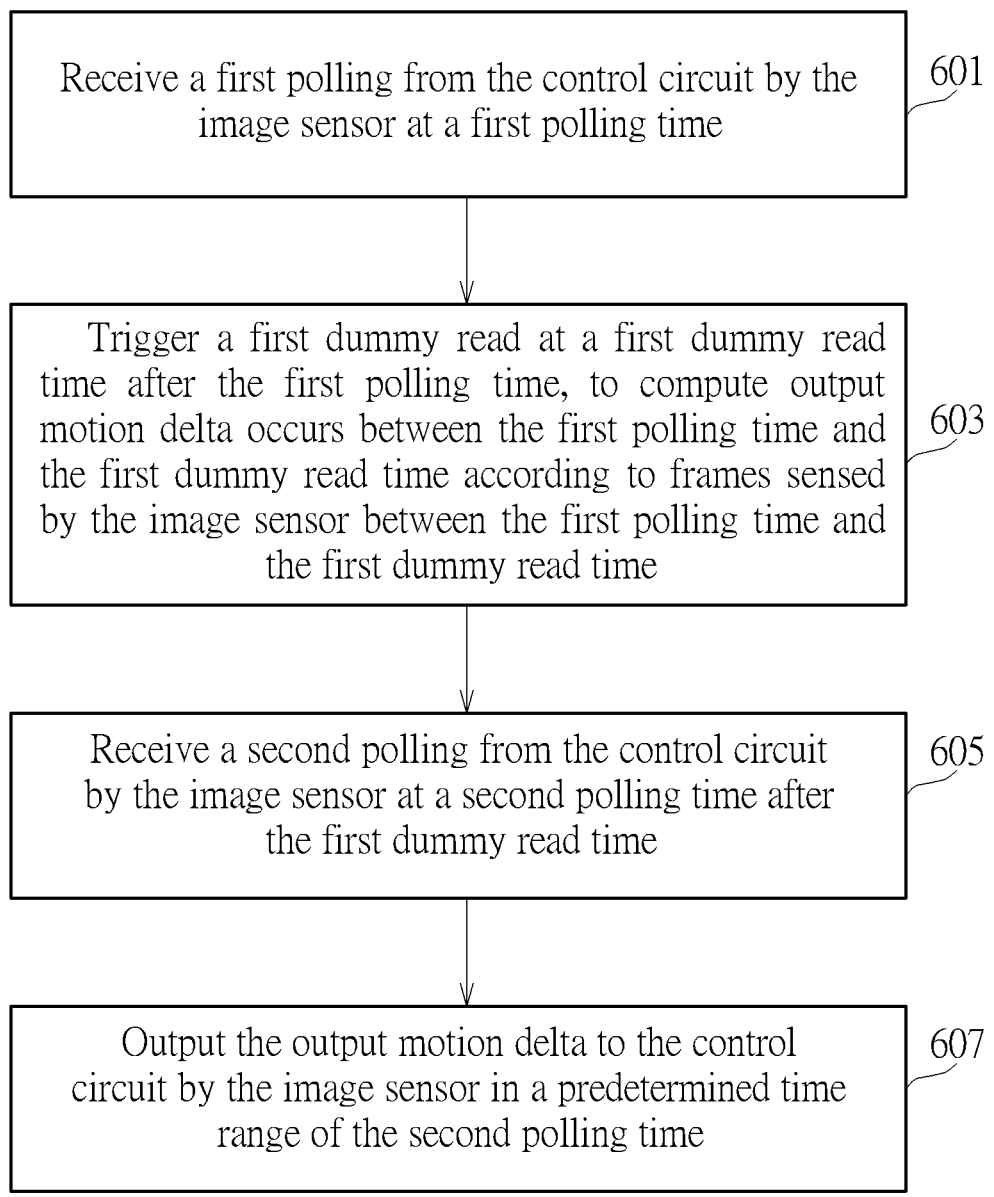
FIG. 6 and FIG. 7 are flow charts illustrating image sensing system control methods according to embodiments of the present invention.

In view of above-mentioned embodiments, image sensing system control methods can be acquired, which can be performed by at least one program recorded in a non-transitory computer readable recording medium such as an optical disc, a hard disk or a memory card. FIG. 6 is a flow chart illustrating an image sensing system control method according to one embodiment of the present invention, which corresponds the embodiment illustrated in FIG. 3, FIG. 5 and comprises following steps:

Step 601

Receiving a first polling (e.g., P1) from the control circuit 201 by the image sensor 203 at a first polling time (e.g., T_P1).

Step 603

Trigger a first dummy read (e.g., DRT1) at a first dummy read time (e.g., T_DRT1) after the first polling time, to compute output motion delta occurs between the first polling time and the first dummy read time according to frames sensed by the image sensor 203 between the first polling time and the first dummy read time Step 605

Receive a second polling (e.g, poll 2) from the control circuit 201 by the image sensor 203 at a second polling time (e.g., T_P2) after the first dummy read time.

Step 607

Output the output motion delta to the control circuit by the image sensor 203 in a predetermined time range of the second polling time.

Figure 7:
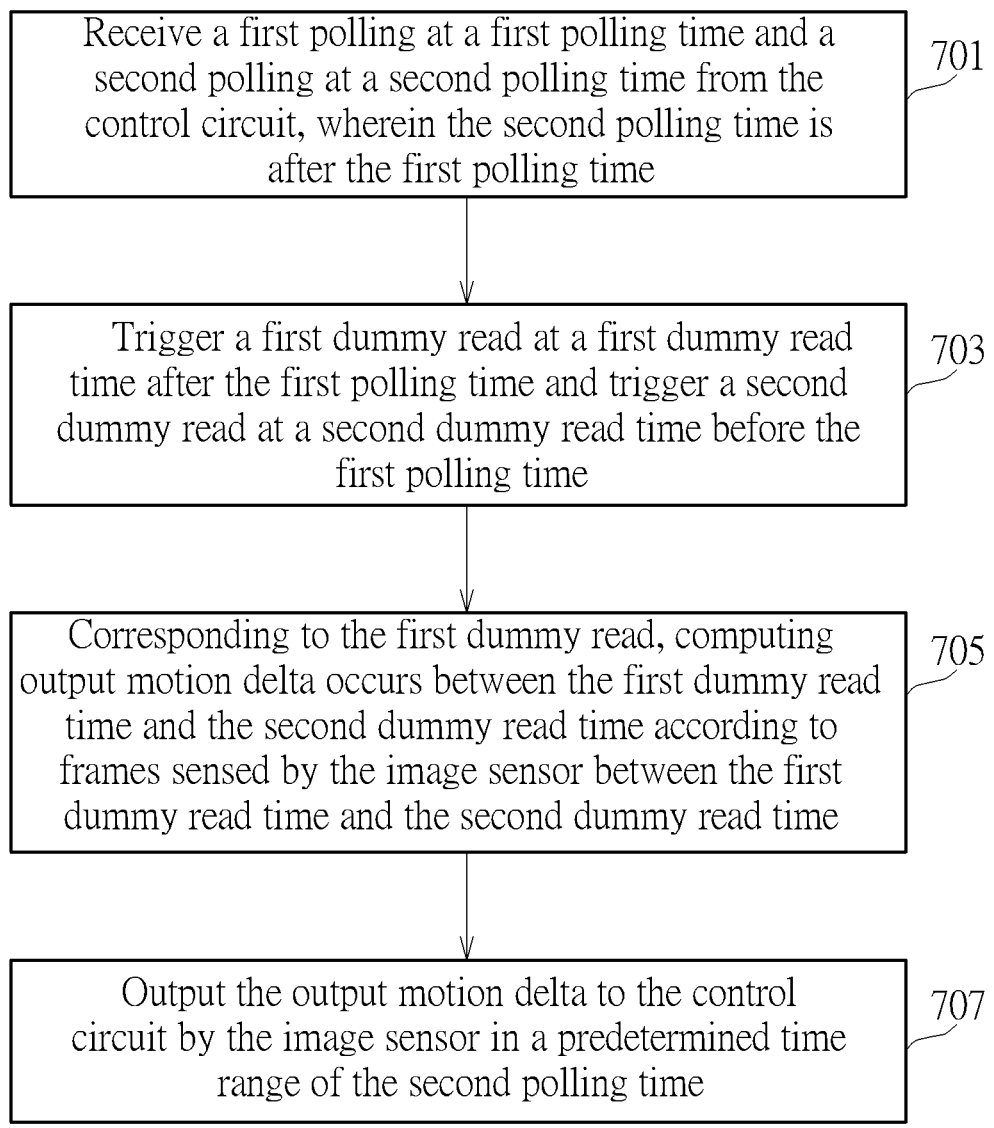

FIG. 7 is a flow chart illustrating an image sensing system control method according to one embodiment of the present invention. FIG. 7 corresponds the embodiment illustrated in FIG. 4 and comprises following steps:

Step 701

Receive a first polling (e.g., P1) at a first polling time (e.g., T_P1) and a second polling (e.g., P2) at a second polling time (e.g., T_P2) from the control circuit 201, wherein the second polling time is after the first polling time.

Step 703

Trigger a first dummy read (e.g., DRT1) at a first dummy read time (e.g., T_DRT1) after the first polling time and trigger a second dummy read (e.g., DRT2) at a second dummy read time (e.g., T_DRT2) before the first polling time.

Step 705

Corresponding to the first dummy read, computing output motion delta occurs between the first dummy read time and the second dummy read time according to frames sensed by the image sensor between the first dummy read time and the second dummy read time.

Step 707

Output the output motion delta to the control circuit 201 by the image sensor 203 in a predetermined time range of the second polling time P2.

Details of the methods illustrated in FIG. 6 and FIG. 7 are described in above-mentioned embodiments, thus are omitted for brevity here.

In view of above-mentioned embodiments, the motion reporting latency can be improved since the output motion delta is computed at the dummy read time rather than a previous polling. Besides, the output motion delta is generated corresponding to the time difference between a dummy read time and a polling time of the polling, thus can reduce the affect caused by non-synchronization between the frame rate and the polling.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-transitory computer readable recording medium comprising at least one program code recorded therein, an image sensing system control method applied to an image sensing system comprising an image sensor and a control circuit can be performed when the program code is executed, the image sensing system control method comprising:
    (a) receiving a first polling from the control circuit by the image sensor at a first polling time;
    (b) corresponding to the first polling, triggering a first dummy read at a first dummy read time after the first polling time by the image sensor, to compute output motion delta occurs between the first polling time and the first dummy read time according to at least one frame sensed by the image sensor between the first polling time and the first dummy read time;
    (c) receiving a second polling from the control circuit by the image sensor at a second polling time after the first dummy read time; and
    (d) outputting the output motion delta to the control circuit by the image sensor in a predetermined time range of the second polling time.

2. The non-transitory computer readable recording medium of claim 1, wherein the image sensor senses a first frame at a first frame time and senses a second frame at a second frame time after the first frame time, wherein the first dummy read time is between the first frame time and the second frame time, wherein the step (b) comprises: computing the output motion delta according to motion delta between the first frame and the second frame, a first time difference between the first frame time and the first dummy read time, and a second time difference between the first dummy read time and the second frame time.

3. The non-transitory computer readable recording medium of claim 2, wherein the step (b) comprises computing the output motion delta according to an equation of $$D1 \times \frac{TD1}{TD1 + TD2},$$

wherein D1 is the motion delta between the first frame and the second frame, TD1 is the first time difference and TD2 is the second time difference.

4. The non-transitory computer readable recording medium of claim 2, wherein the image sensing system control method further comprises:
    sensing a third frame at a third frame time by the image sensor before the first polling time;
    sensing a fourth frame at a fourth frame time by the image sensor before the third frame time;
    triggering a second dummy read at a second dummy read time between the third frame time and the fourth frame time;
    wherein the step (b) comprises: computing the output motion delta according to motion delta between the third frame and the fourth frame, a third time difference between the third frame time and the second dummy read time, and a fourth time difference between the second dummy read time and the fourth frame time.

5. The non-transitory computer readable recording medium of claim 4, wherein the step (b) comprises computing the output motion delta according to an equation of $$D2 \times \frac{TD3}{TD3 + TD4},$$

wherein D2 is the motion delta between the third frame and the fourth frame, T3 is the third time difference and T4 is the fourth time difference.

6. The non-transitory computer readable recording medium of claim 1, wherein the first dummy read time is after the first polling time for a dummy time interval, wherein a value of the dummy time interval makes at least one of the frame exists between the first dummy read time and the second polling time.

7. The non-transitory computer readable recording medium of claim 6, wherein the value of the dummy time interval is smaller than $$\frac{1}{MP} - \frac{1}{SFm},$$

wherein MP is a polling rate of the control circuit, and SFm is a minimum frame rate of the image sensor.

8. The non-transitory computer readable recording medium of claim 1, wherein the image sensing system control method further comprises:

sensing at least one frame at least one frame time by the image sensor between the first dummy read time and the first polling time, wherein a fifth frame is sensed at a fifth frame time, wherein the fifth frame is a frame closest to the first polling time among frames after the first polling;

wherein the step (b) further computes the output motion delta according to motion delta between the first frame and the fifth frame.

9. The non-transitory computer readable recording medium of claim 1, wherein the image sensing system control method further comprises:

triggering a second dummy read at a second dummy read time before the first polling time;

sensing at least one frame in at least one frame time by the image sensor between the second dummy read time and the first polling time, wherein a third frame is sensed at a third frame time, wherein the third frame is a frame closest to the second dummy read among frames after the second dummy read;

wherein the step (b) further computes the output motion delta according to motion delta between the first frame and the third frame.

10. An image sensing system, comprising:
a control circuit; and
an image sensor, configured to perform:
(a) receiving a first polling from the control circuit by the image sensor at a first polling time;
(b) corresponding to the first polling, triggering a first dummy read at a first dummy read time after the first polling time, to compute output motion delta occurs between the first polling time and the first dummy read time according to at least one frame sensed by the image sensor between the first polling time and the first dummy read time;
(c) receiving a second polling from the control circuit at a second polling time after the first dummy read time; and
(d) outputting the output motion delta to the control circuit in a predetermined time range of the second polling time.

11. The image sensing system of claim 10, wherein the image sensor senses a first frame at a first frame time and senses a second frame at a second frame time after the first frame time, wherein the first dummy read time is between the first frame time and the second frame time, wherein the step (b) comprises: computing the output motion delta according to motion delta between the first frame and the second frame, a first time difference between the first frame time and the first dummy read time, and a second time difference between the first dummy read time and the second frame time.

12. The image sensing system of claim 11, wherein the step (b) comprises computing the output motion delta according to an equation of $$D1 \times \frac{TD1}{TD1 + TD2},$$

wherein D1 is the motion delta between the first frame and the second frame, TD1 is the first time difference and TD2 is the second time difference.

13. The image sensing system of claim 11, wherein the image sensor further performs following steps:

sensing a third frame at a third frame time by the image sensor before the first polling time;

sensing a fourth frame at a fourth frame time by the image sensor before the third frame time;

triggering a second dummy read at a second dummy read time between the third frame time and the fourth frame time;

wherein the step (b) comprises: computing the output motion delta according to motion delta between the third frame and the fourth frame, a third time difference between the third frame time and the second dummy read time, and a fourth time difference between the second dummy read time and the fourth frame time.

14. The image sensing system of claim 13, wherein the step (b) comprises computing the output motion delta according to an equation of $$D2 \times \frac{TD3}{TD3 + TD4},$$

wherein D2 is the motion delta between the third frame and the fourth frame, TD3 is the third time difference and TD4 is the fourth time difference.

15. The image sensing system of claim 10, wherein the first dummy read time is after the first polling time for a dummy time interval, wherein a value of the dummy time interval makes at least one of the frame exists between the first dummy read time and the second polling time.

16. The image sensing system of claim 15, wherein the value of the dummy time interval is smaller than $$\frac{1}{MP} - \frac{1}{SFm},$$

wherein MP is a polling rate of the control circuit, and SFm is a minimum frame rate of the image sensor.

17. The image sensing system of claim 10, wherein the image sensor further performs following steps:

sensing at least one frame in at least one frame time by the image sensor between the first dummy read time and the first polling time, wherein a fifth frame is sensed at a fifth frame time, wherein the fifth frame is a frame closest to the first polling among frames after the first polling;

wherein the step (b) further computes the output motion delta according to motion delta between the first frame and the fifth frame.

18. The image sensing system of claim 10, wherein the image sensor further performs following steps:

triggering a second dummy read at a second dummy read time before the first polling time;

sensing at least one frame in at least one frame time by the image sensor between the second dummy read time and the first polling time, wherein a third frame is sensed at a third frame time, wherein the third frame time is a frame closest to the second dummy read among frames after the second dummy read;

wherein the step (b) further computes the output motion delta according to motion delta between the first frame and the third frame.

19. A non-transitory computer readable recording medium comprising at least one program code recorded therein, an image sensing system control method applied to an image sensing system comprising an image sensor and a control circuit can be performed when the program code is executed, the image sensing system control method comprising:

(a) receiving a first polling at a first polling time and a second polling at a second polling time from the control circuit, wherein the second polling time is after the first polling time;

(b) triggering a first dummy read at a first dummy read time after the first polling time by the image sensor and triggering a second dummy read at a second dummy read time before the first polling time by the image sensor;

(c) corresponding to the first dummy read, computing output motion delta occurs between the first dummy read time and the second dummy read time according to frames sensed by the image sensor between the first dummy read time and the second dummy read time; and (d) outputting the output motion delta to the control circuit by the image sensor in a predetermined time range the second polling time.

20. The non-transitory computer readable recording medium of claim 19, wherein the image sensing system control method further comprises:

sensing a third frame at a third frame time by the image sensor before the first polling time and after the second dummy read time;

sensing a fourth frame at a fourth frame time by the image sensor before the second dummy read time;

wherein the step (c) comprises: computing the output motion delta according to motion delta between the third frame and the fourth frame, a third time difference between the third frame time and the second dummy read time, and a fourth time difference between the second dummy read time and the fourth frame time.

21. The non-transitory computer readable recording medium of claim 20, wherein the step (c) comprises computing the output motion delta according to an equation of $$D2 \times \frac{T3}{T3+T4},$$

wherein D2 is the motion delta between the third frame and the fourth frame, T3 is the third time difference and T4 is the fourth time difference.

22. The non-transitory computer readable recording medium of claim 19, wherein the first dummy read time is after the first polling time for a dummy time interval, wherein a value of the dummy time interval makes at least one of the frame exists between the first dummy read time and the second polling time.

23. The non-transitory computer readable recording medium of claim 22, wherein the value of the dummy time interval is smaller than $$\frac{1}{MP} - \frac{1}{SFm},$$

wherein MP is a polling rate of the control circuit, and SFm is a minimum frame rate of the image sensor.

* * * * *